(12) United States Patent
Zhu

(10) Patent No.: US 11,627,070 B2
(45) Date of Patent: Apr. 11, 2023

(54) DATA PACKET PROCESSING METHOD AND APPARATUS, STORAGE MEDIUM, AND ELECTRONIC DEVICE

(71) Applicant: ZTE Corporation, Shenzhen (CN)

(72) Inventor: Xiangyang Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/043,052

(22) PCT Filed: Mar. 1, 2019

(86) PCT No.: PCT/CN2019/076756
§ 371 (c)(1),
(2) Date: Sep. 29, 2020

(87) PCT Pub. No.: WO2019/205806
PCT Pub. Date: Oct. 31, 2019

(65) Prior Publication Data
US 2021/0036950 A1   Feb. 4, 2021

(30) Foreign Application Priority Data
Apr. 25, 2018   (CN) .......................... 201810379327.2

(51) Int. Cl.
*H04L 45/16* (2022.01)
*H04L 45/745* (2022.01)

(52) U.S. Cl.
CPC ............ *H04L 45/16* (2013.01); *H04L 45/745* (2013.01)

(58) Field of Classification Search
CPC ..... H04L 45/16; H04L 45/745; H04L 45/742; H04L 12/1881; H04L 45/28
See application file for complete search history.

(56) References Cited

U.S. PATENT DOCUMENTS 9,832,031 B2 * 11/2017 Zhao ................... H04L 43/0811
11,258,698 B2 * 2/2022 Xie ..................... H04L 12/4633
(Continued)

FOREIGN PATENT DOCUMENTS

| CN | 104811387 A | 7/2015 |
| CN | 105556899 A | 5/2016 |

(Continued)

OTHER PUBLICATIONS

International Search Report for corresponding application PCT/CN2019/076756 filed Mar. 1, 2019; dated May 20, 2019.
(Continued)

*Primary Examiner* — Donald L Mills
(74) *Attorney, Agent, or Firm* — Cantor Colburn LLP

(57) ABSTRACT

The embodiments of the present disclosure provide a data packet processing method and apparatus, a storage medium and an electronic device. The method includes that: a Bit Index Explicit Replication (BIER) Multicast Identifier (BMID) information of a data packet is set, wherein the BMID information is used for indicating a multicast channel to which the data packet belongs; and the BMID information is sent to a Bit-Forwarding Ingress Router (BFIR). Through the solution in the embodiments of the present disclosure, the technical problem in the related art that a node receives duplicate data packets is solved, duplicate data packets may be prevented, and data transmission efficiency is improved.

5 Claims, 10 Drawing Sheets

(56) References Cited

U.S. PATENT DOCUMENTS

| 2015/0078377 | A1 | 3/2015 | Wijnands |
| 2015/0138961 | A1 | 5/2015 | Wijnands |
| 2016/0119159 | A1 | 4/2016 | Zhao |
| 2017/0019344 | A1* | 1/2017 | Przygienda ............. H04L 12/18 |
| 2018/0278470 | A1* | 9/2018 | Wijnands ............ H04L 41/0668 |
| 2018/0287935 | A1* | 10/2018 | Wang .................. H04L 12/4633 |
| 2018/0375799 | A1* | 12/2018 | Liu ..................... H04L 12/1886 |

FOREIGN PATENT DOCUMENTS

| CN | 105812197 A | 7/2016 |
| CN | 107171977 A | 9/2017 |
| CN | 107204867 A | 9/2017 |

OTHER PUBLICATIONS

European Search Report for corresponding application EP19793365; dated Jun. 4, 2021.
Wolfgang Braun, "Performance Comparison of Resilience Mechanisms for Stateless Multicast Using BIER" 2017 IFIP/IEE International Symposium on Intergrated Network Management, XP33127614A.
European Search Report for corresponding application EP 19 79 3365; Report dated Jun. 4, 2021.
Wolfgang Braun, "Performance Comparison of Resilience Mechanisms for Stateless Multicast Using BIER", 2017 IFIP/IEE International Symposium on Intergrated Network Management.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              BIFT-id          | TC  |S|       TTL             |
+-+-+-+-+-+-+-+-+-+-+-+-+-+-+-+-+-+-+-+-+-+-+-+-+-+-+-+-+-+-+-+-+
|Nibble | Ver  | BSL |                 Entropy                  |
+-+-+-+-+-+-+-+-+-+-+-+-+-+-+-+-+-+-+-+-+-+-+-+-+-+-+-+-+-+-+-+-+
|OAM|Rsv|   DSCP    |    Proto   |          BFIR-id             |
+-+-+-+-+-+-+-+-+-+-+-+-+-+-+-+-+-+-+-+-+-+-+-+-+-+-+-+-+-+-+-+-+
|                  BitString (first 32 bits)                   ~
+-+-+-+-+-+-+-+-+-+-+-+-+-+-+-+-+-+-+-+-+-+-+-+-+-+-+-+-+-+-+-+-+
~                                                              ~
+-+-+-+-+-+-+-+-+-+-+-+-+-+-+-+-+-+-+-+-+-+-+-+-+-+-+-+-+-+-+-+-+
~                   BitString (last 32 bits)                    |
+-+-+-+-+-+-+-+-+-+-+-+-+-+-+-+-+-+-+-+-+-+-+-+-+-+-+-+-+-+-+-+-+
```

Fig. 1

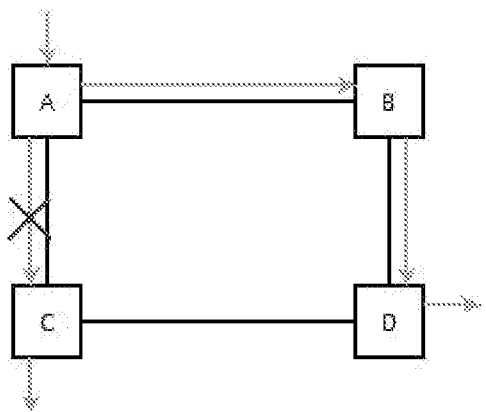

Fig. 2A

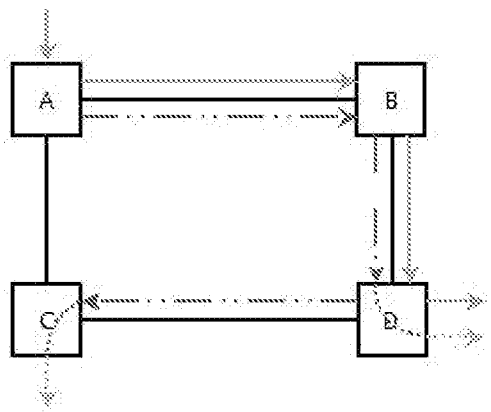

Fig. 2B

```
-----------------------------------------------
| Source IP   | Dest Multicast |    BMID      |
|             | IP             |              |
===============================================
| 1.1.1.1/32  |    224.1.1.1   |     1        |
-----------------------------------------------
| 1.1.1.2/32  |    225.1.1.1   |     2        |
-----------------------------------------------
| 1.1.1.3/24  |    226.1.1.1   |     1        |
-----------------------------------------------
| 1.1.1.4/32  |    227.1.1.1   |     2        |
-----------------------------------------------
...
```

```
---------------------------------------------
| FRR Adjacency | BMID   | LDBitMask        |
| Index         |        |                  |
=============================================
| 0:1           | 1      | ..0010000        |
---------------------------------------------
| 0:1           | 2      | ..0011000        |
---------------------------------------------
| 0:2           | 1      | ..0000100        |
---------------------------------------------
| 0:2           | 2      | ..0001100        |
---------------------------------------------
...
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               BIFT-id                 | TC  |S|     TTL       |
+-+-+-+-+-+-+-+-+-+-+-+-+-+-+-+-+-+-+-+-+-+-+-+-+-+-+-+-+-+-+-+-+
|Nibble | Ver   | BSL   |             Entropy                   |
+-+-+-+-+-+-+-+-+-+-+-+-+-+-+-+-+-+-+-+-+-+-+-+-+-+-+-+-+-+-+-+-+
|OAM|Rsv|   DSCP    |    Proto  |             BFIR-id           |
+-+-+-+-+-+-+-+-+-+-+-+-+-+-+-+-+-+-+-+-+-+-+-+-+-+-+-+-+-+-+-+-+
|                        BMID                                   |
+-+-+-+-+-+-+-+-+-+-+-+-+-+-+-+-+-+-+-+-+-+-+-+-+-+-+-+-+-+-+-+-+
|                   BitString  (first 32 bits)                  ~
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
~                   BitString  (last 32 bits)                   |
+-+-+-+-+-+-+-+-+-+-+-+-+-+-+-+-+-+-+-+-+-+-+-+-+-+-+-+-+-+-+-+-+
```

Fig. 10A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               BIFT-id                 | TC  |S|     TTL       |
+-+-+-+-+-+-+-+-+-+-+-+-+-+-+-+-+-+-+-+-+-+-+-+-+-+-+-+-+-+-+-+-+
|Nibble | Ver   | BSL   |           Entropy(BMID)               |
+-+-+-+-+-+-+-+-+-+-+-+-+-+-+-+-+-+-+-+-+-+-+-+-+-+-+-+-+-+-+-+-+
|OAM|F|R|   DSCP    |    Proto  |             BFIR-id           |
+-+-+-+-+-+-+-+-+-+-+-+-+-+-+-+-+-+-+-+-+-+-+-+-+-+-+-+-+-+-+-+-+
|                   BitString  (first 32 bits)                  ~
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
~                   BitString  (last 32 bits)                   |
+-+-+-+-+-+-+-+-+-+-+-+-+-+-+-+-+-+-+-+-+-+-+-+-+-+-+-+-+-+-+-+-+
```

Fig. 10B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               BIFT-id                 | TC  |S|     TTL       |
+-+-+-+-+-+-+-+-+-+-+-+-+-+-+-+-+-+-+-+-+-+-+-+-+-+-+-+-+-+-+-+-+
|Nibble | Ver   | BSL   |             Entropy                   |
+-+-+-+-+-+-+-+-+-+-+-+-+-+-+-+-+-+-+-+-+-+-+-+-+-+-+-+-+-+-+-+-+
|OAM|Rsv|   BMID    |    Proto  |             BFIR-id           |
+-+-+-+-+-+-+-+-+-+-+-+-+-+-+-+-+-+-+-+-+-+-+-+-+-+-+-+-+-+-+-+-+
|                   BitString  (first 32 bits)                  ~
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
~                   BitString  (last 32 bits)                   |
+-+-+-+-+-+-+-+-+-+-+-+-+-+-+-+-+-+-+-+-+-+-+-+-+-+-+-+-+-+-+-+-+
```

Fig. 10C

DATA PACKET PROCESSING METHOD AND APPARATUS, STORAGE MEDIUM, AND ELECTRONIC DEVICE

TECHNICAL FIELD

The present disclosure relates to the field of communication, and particularly to a data packet processing method and apparatus, a storage medium and an electronic device.

BACKGROUND

A multicast forwarding technology called Bit Index Explicit Replication (BIER) is proposed by the Internet Engineering Task Force (IETF). Based on BIER, a traffic-engineering-based BIER forwarding architecture, called BIER-Traffic Engineering (BIER-TE) is proposed. A control plane (for example, a Software Defined Network (SDN) controller), which is responsible for calculating a multicast service path and transmitting information of a forwarding table, a multicast route and the like to a forwarding apparatus, is introduced into BIER-TE to make multicast traffic more flexible and controllable.

Multicast traffic is transmitted in a BIER-TE network. An ingress node of the BIER (i.e., Bit-Forwarding Ingress Router (BFIR)) performs BIER encapsulation on a multicast data packet. A specific encapsulation format is specified for a Multiple Protocol Label Switching (MPLS) network, as shown in FIG. 1, which is a schematic diagram of a BIER header encapsulation structure in an MPLS network according to the related art of the present disclosure. In a BIER header, a bitstring field represents a specific forwarding path of a multicast flow, and each Bit Forwarding Router (BFR) looks up a forwarding table according to a Bit Position (BP) in a bitstring and executes replication and forwarding operations. If the bitstring is matched with a forwarding table entry of which a type is local-decap in the forwarding table, a Bit-Forwarding Egress Router (BFER) decapsulates a BIER packet and delivers the payload to a network specified by a Proto field.

In order to provide failure protection for a link or a node in a BIER-TE network, some failure protection measures include, for example, Header Modification (HM) and BIER-in-BIER Encapsulation (BBE). In the BIER-TE network, a backup path is calculated through a control plane. By virtue of the BBE technology, BIER encapsulation is further performed on a BIER data packet and a BIER protection tunnel is established between a failure point and each of a Next Hop (NH) and next hops of the NH (i.e., Next Next Hops (NNHs)). By virtue of the HM technology, a header bitstring is modified so that the failure data packet is directed to the backup path instead. Compared with other Fast ReRouter (FRR) technologies such as Resource ReSerVation Protocol-Traffic Engineering (RSVP-TE)/Point to Multiple Point (P2MP) FRR, HM and BEE reduce an overhead for routing of a forwarding apparatus and a signaling overhead for tunnel establishment and have many advantages.

However, in some cases, these technologies may cause duplicate reception of data packets by some nodes. Taking BBE as an example, FIGS. 2A and 2B are schematic diagrams illustrating a node that receives duplicate packets in BIER-in-BIER FRR according to the related art of the present disclosure. As shown in FIG. 2A, an ingress node of a multicast service is A, egress nodes are C and D, and a transmission path of the multicast service is represented by the arrowed solid line under a normal condition. According to the BBE technology, when a link (A, C) fails, the node A performs BBE on a BIER data packet which is to be sent to the failure link, destination nodes are C (NH) and D (NNH). A BIER-in-BIER protection path for encapsulation is represented by the arrowed dot-and-dash line in FIG. 2B, a transmission path for the BIER data packet obtained by decapsulating a BIER-in-BIER packet is represented by the arrowed dotted line in FIG. 2B, and the dotted line in the node represents that the BIER-in-BIER data packet is decapsulated at the node to obtain the BIER data packet for further processing. A pop-up operation is executed on both the BIER data packet represented by the arrowed solid line and the FRR BIER data packet represented by the arrowed dotted line at the node D, and as a result, the node D may receive duplicate data packets. There is yet no specific solution to this problem at present.

For the problem in the related art, there is yet no effective solution found at present.

SUMMARY

Embodiments of the present disclosure provide a data packet processing method and apparatus, a storage medium and an electronic device.

According to an embodiment of the present disclosure, a data packet processing method is provided, which may include that: BIER Multicast Identifier (BMID) information of a data packet is set, wherein the BMID information is used for indicating a multicast channel to which the data packet belongs; and the BMID information is sent to a BFIR.

According to an embodiment of the present disclosure, another data packet processing method is provided, which may include that: a Channel Node Mapping Table (CNMT) is created at a local node, wherein the CNMT is used for indicating a multimedia service flow and local-decap BP information of the local node for each NNH, on which a pop-up operation is not required to be executed, of an adjacent node; and when the adjacent node fails, FRR protection is performed on a data packet to be sent to the adjacent node according to the CNMT, wherein the data packet contains BMID information.

According to another embodiment of the present disclosure, a data packet processing apparatus is provided, which may include: a setting module, configured to set BMID information of a data packet, wherein the BMID information is used for indicating a multicast channel to which the data packet belongs; and a sending module, configured to send the BMID information to a BFIR.

According to another embodiment of the present disclosure, a data packet processing apparatus is provided, which may include: a creation module, configured to create a CNMT at a local node, wherein the CNMT is used for indicating a multimedia service flow and local-decap BP information of the local node for each NNH, on which a pop-up operation is not required to be executed, of an adjacent node; and a processing module, configured to, when the adjacent node fails, perform FRR protection on a data packet to be sent to the adjacent node according to the CNMT, wherein the data packet contains BMID information.

According another embodiment of the present disclosure, a storage medium is also provided, in which a computer program may be stored, the computer program, when being executed, performs the operations in any abovementioned method embodiment.

According to another embodiment of the present disclosure, an electronic device is also provided, which may include a memory and a processor. A computer program may be stored in the memory. The processor may be configured to execute the computer program to perform the operations in any abovementioned method embodiment.

Through the present disclosure, BMID information configured to represent a multicast service of a data packet is encapsulated and sent to a BFIR of a network, so that a recognition capability of a data packet forwarding apparatus may be enhanced, and data packet replications may be eliminated. The technical problem in the related art that a node receives duplicate data packets is solved, duplicate data packets may be prevented, and data transmission efficiency is improved.

BRIEF DESCRIPTION OF THE DRAWINGS

The drawings described here are adopted to provide a further understanding to the present disclosure and form a part of the present application. Schematic embodiments of the present disclosure and descriptions thereof are adopted to explain the present disclosure rather than improperly limit the present disclosure. In the drawings:

FIG. 1 is a schematic diagram of a BIER header encapsulation structure in an MPLS network according to the related art of the present disclosure;

FIGS. 2A and 2B are schematic diagrams that a node receives duplicate packets in BIER-in-BIER FRR according to the related art of the present disclosure;

FIGS. 10A to 10C are schematic diagrams showing the forms of representing BMID information according to an implementation mode 1;

DETAILED DESCRIPTION OF THE EMBODIMENTS

The present disclosure will be described below with reference to the drawings and in combination with the embodiments in detail. It is to be noted that the embodiments in the present application and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

Embodiment 1

Figure 3:
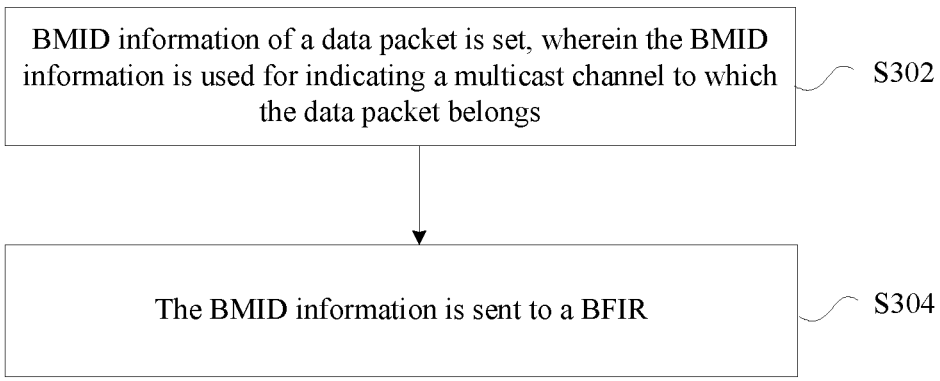
FIG. 3 is a flowchart of a data packet processing method according to an embodiment of the present disclosure.

The embodiment provides a data packet processing method. FIG. 3 is a flowchart of a data packet processing method according to an embodiment of the present disclosure. As shown in FIG. 3, the flow includes the following operations.

In operation S302, BMID information of a data packet is set, wherein the BMID information is used for indicating a multicast channel to which the data packet belongs.

In operation S304, the BMID information is sent to a BFIR.

Through the operations, the BMID information used for indicating multicast channel to which the data packet belongs is set and sent to the BFIR of a network, so that a recognition capability of a data packet forwarding apparatus may be enhanced, and data packet replications may be eliminated. The technical problem in the related art that a node receives duplicate data packets is solved, duplicate data packets may be prevented, and data transmission efficiency is improved.

In at least one exemplary embodiment, an executer of the operations may be a network controller such as an SDN controller, and the method may be applied, but not limited, to a BIER-TE FRR network such as BBE FRR and HM FRR.

In at least one exemplary embodiment, the BMID information may be encapsulated in the following two manners:

a data packet which is to enter a BIER-TE network is determined, and the BMID information is encapsulated in a first field of a BIER header of the data packet, wherein the first field may be any field; and the BMID information is set through a preset mapping table, wherein the preset mapping table is used for indicating a corresponding relationship between multicast route information and the BMID information.

In at least one exemplary embodiment, the operation that the BMID information is sent to the BFIR includes that: the BMID information is sent to the BFIR when sending multicast forwarding information of the data packet.

Figure 4:
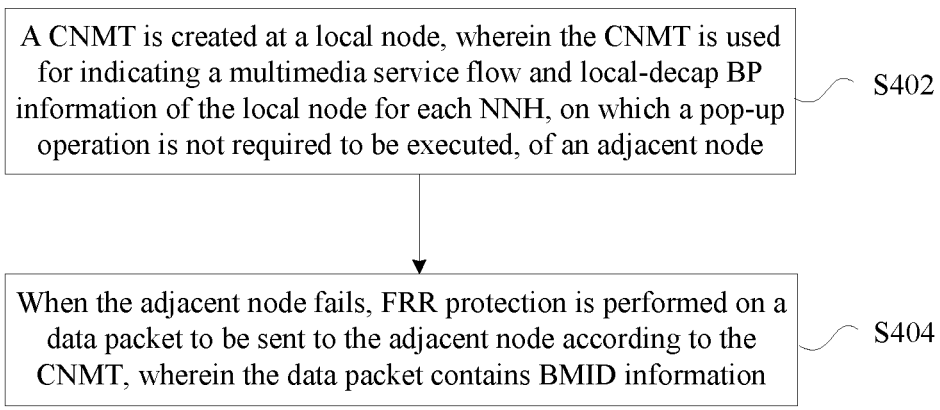
FIG. 4 is a flowchart of another data packet processing method according to an embodiment of the present disclosure.

The embodiment provides another data packet processing method. FIG. 4 is a flowchart of another data packet processing method according to an embodiment of the present disclosure. As shown in FIG. 4, the flow includes the following operations.

In operation S402, a CNMT is created at a local node, wherein the CNMT is used for indicating a multimedia service flow and local-decap BP information of the local node for each NNH, on which a pop-up operation is not required to be executed, of an adjacent node.

In operation S404, when the adjacent node fails, FRR protection is performed on a data packet to be sent to the adjacent node according to the CNMT, wherein the data packet contains BMID information.

In at least one exemplary embodiment, the operation that FRR protection is performed on the data packet to be sent to the adjacent node according to the CNMT includes that: the CNMT is queried and it is determined to execute the pop-up operation on the data packet on the NNH, which is specified by a bitstring in an outer-layer BIER header, of the adjacent node. An AND operation may be executed on a local-decap bit mask (LDBitMask) and the bitstring of the outer-layer BIER header, and if a bit corresponding to a BP of a certain NNH is 0, the pop-up operation is not required to be executed on this NNH, otherwise the pop-up operation is required to be executed on the node. The operation that the CNMT is queried includes that: the BMID information in the data packet of the adjacent node is acquired; and the CNMT is queried according to the BMID information.

In the embodiment, table entries of the CNMT include adjacency, the BMID information and an LDBitMask formed by the local-decap BP information of each NNH on which the pop-up operation is not required to be executed for the data packet.

In at least one exemplary embodiment, the operation that FRR protection is performed on the data packet of the adjacent node according to the CNMT includes the following operations:

a BIER-TE Adjacency FRR Table (BTAFT) is looked up by taking adjacency as an index to obtain a ResetBitMask and an AddBitMask;

a bitstring of an inner-layer BIER header is modified according to the ResetBitMask, wherein the data packet includes an inner-layer BIER packet and an outer-layer BIER packet, and the BIER headers corresponding to the inner-layer BIER packet and the outer-layer BIER packet are an inner-layer BIER header and an outer-layer BIER header respectively;

the outer-layer BIER header is parsed to obtain the BMID information of a multicast service to which the data packet belongs;

the CNMT is looked up by taking the adjacency and the BMID information as indexes to obtain the LDBitMask;

the bitstring of the outer-layer BIER header is calculated according to the AddBitMask and the LDBitMask; and a BIER-in-BIER data packet is encapsulated by use of the bitstring of the outer-layer BIER header, and the BIER-in-BIER data packet is forwarded.

Through the above descriptions about the implementation modes, those skilled in the art may clearly know that the methods according to the embodiment may be implemented in a manner of combining software and a required universal hardware platform and, of course, may also be implemented through hardware, but the former is an exemplary implementation mode under many circumstances. Based on such an understanding, the substance of the technical solutions of the present disclosure or in other words the parts making contributions to a conventional art may be embodied in form of a software product. The computer software product may be stored in a storage medium such as a Read-Only Memory (ROM)/Random Access Memory (RAM), a magnetic disk and an optical disk, including a plurality of instructions configured to enable a terminal device (for example, a mobile phone, a computer, a server or a network device) to execute the method of each embodiment of the present disclosure.

Embodiment 2

The embodiment provides a data packet processing apparatus, which is configured to implement the abovementioned embodiments and exemplary implementation modes. What has been described will not be elaborated. For example, term "module" used below may be a combination of software and/or hardware capable of realizing a preset function. Although the apparatus described in the following embodiment is preferably implemented with software, implementation with hardware or a combination of the software and the hardware is also possible and conceivable.

Figure 5:
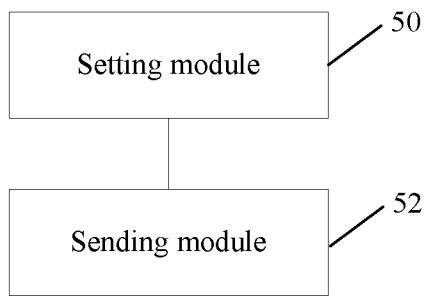
FIG. 5 is a structure block diagram of a data packet processing apparatus according to an embodiment of the present disclosure.

FIG. 5 is a structure block diagram of a data packet processing apparatus according to an embodiment of the present disclosure. As shown in FIG. 5, the apparatus includes:

a setting module 50, configured to set BMID information of a data packet, wherein the BMID information is used for indicating a multicast channel to which the data packet belongs; and a sending module 52, configured to send the BMID information to a BFIR.

Figures 6, 7, 8:
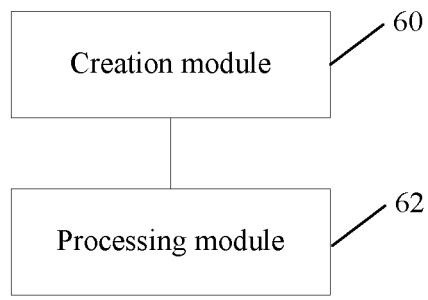
FIG. 6 is a structure block diagram of another data packet processing apparatus according to an embodiment of the present disclosure.
FIG. 7 is a structure diagram of a multicast address tag mapping table according to an embodiment.
FIG. 8 is a structure diagram of a CNMT according to an embodiment.

FIG. 6 is a structure block diagram of another data packet processing apparatus according to an embodiment of the present disclosure. As shown in FIG. 6, the apparatus includes:

a creation module 60, configured to create a CNMT at a local node, wherein the CNMT is used for indicating a multimedia service flow and local-decap BP information of the local node for each NNH, on which a pop-up operation is not required to be executed, of an adjacent node; and a processing module 62, configured to, when the adjacent node fails, perform FRR protection on a data packet to be sent to the adjacent node according to the CNMT, wherein the data packet contains BMID information.

It is to be noted that each module may be implemented through software or hardware and, under the latter condition, may be implemented in, but not limited to, the following manner: the modules are all positioned in the same processor, or the modules are positioned in different processors in any combination form respectively.

Embodiment 3

The embodiment provides a method and system for preventing duplicate packets in BIER-TE FRR. The contents of the embodiment of the present disclosure are explained with a BBE FRR technology as an example. It is to be emphasized that the solution for preventing duplicate packets proposed in the present disclosure may also be applied to another BIER-TE FRR solution such as HM FRR.

FRR solutions such as BBE and HM can be based on topology and unrelated to specific multicast services. Consequently, due to the lack of detailed multicast route information about a service, an adopted universal protection path may result in a situation where some nodes may receive duplicate data packets under a specific service condition. According to the embodiment of the present disclosure, for example, for BBE FRR, multicast service related information is added based on the BBE technology to enhance a recognition capability of a forwarding apparatus and eliminate repetitions of a data packet.

Exemplarily, it is proposed in the embodiment that a control plane maintains a BIER Multicast Identifier (BMID) for a BIER multicast channel in a BIER-TE network, and if multiple multicast services in the same subdomain have the same multicast tree in the BIER-TE network, the multiple multicast services may share the same BIER multicast channel. The BMID is assigned with a value in a specified interval range, and is transmitted to a BFIR together with multicast forwarding information. When the BIER multicast channel is deleted, the control plane simultaneously recycles the BMID resource bound with the BIER multicast channel.

In an embodiment, a BFR is required to be capable of recognizing BMID information of a multicast data packet entering the BIER-TE network. During implementation, two embodiments may be adopted to provide the BMID information.

In a first embodiment of the present invention, when performing BIER encapsulation on a multicast data packet which is to enter the BIER-TE network, a BFIR encapsulates BMID information of a multicast service to which the data packet belongs, and the BMID information may be represented by use of some fields in a BIER header or a field newly added in the BIER header.

In a second embodiment of the present invention, a mapping table is added in a switch to maintain the BMID information corresponding to multicast (source Internet Protocol (IP) address, destination multicast address). FIG. 7 is a structure diagram of a multicast address tag mapping table according to the embodiment. As shown in FIG. 7, the BFR may parse the data packet to obtain IP addresses of the multicast source and destination and look up the table to obtain the BMID.

In an embodiment, a table, called a CNMT, is added for each adjacency of a Point of Local-Repair N (PLRN) in the network and, for each multicast service flow, local-decap BP information of the PLRN for each NNH of the adjacency is maintained. When the PLRN implements FRR protection on a certain adjacency, the table is looked up to determine whether a pop-up operation is required to be executed on a BIER-in-BIER data packet at a certain NNH specified by a bitstring in an outer-layer BIER header or not.

Exemplarily, the table may be designed to include three fields respectively representing the adjacency, the BMID and the local-decap BP information, referred to as LDBitMasks, of the NNHs where the BIER-in-BIER data packet is not required to be popped up. FIG. 8 is a structure diagram of a CNMT according to the embodiment. As shown in FIG. 8, when a multicast service is deployed or a multicast path changes, the controller is required to calculate an LDBitMask for each PLR along the multicast path.

Exemplarily, for a certain adjacency of a PLRN in a multicast tree of a BMID of a certain multicast service, an LDBitMask is calculated through the following flow:

all NNHs of the adjacency of the PLRN are counted;

for each NNH, whether a link (PLRN, NH) is on a path from a BFIR to the NNH in the multicast tree or not is checked, and if the link (PLRN, NH) is not on the path from the BFIR to the NNH, the LDBitMask includes a local-decap BP of the NNH;

for each NNH, whether the NNH serves as a child node of a multicast tree or not is checked, and if the NNH serves as a child node of the multicast tree, the LDBitMask includes the local-decap BP of the NNH; and if the LDBitMask is not 0, table entries (adjacency, BMID, LDBitMask) are added into a CNMT of the PLRN.

For providing protection for BIER-in-BIER, a BTAFT can be added. A ResetBitMask and an AddBitMask in the BTAFT are based on a topology and, when a system is started or the topology changes, the ResetBitMask and an AddBitMask are calculated and transmitted by the controller.

During implementation, in an embodiment of the present disclosure, the control plane may transmit information of the BMID, the LDBitMask and the like to the forwarding apparatus through a southbound protocol such as the Network Configuration Protocol (NetConf), the Border Gateway Protocol Link-State (BGP-LS) or Path Computation Element (PCE).

Figure 9:
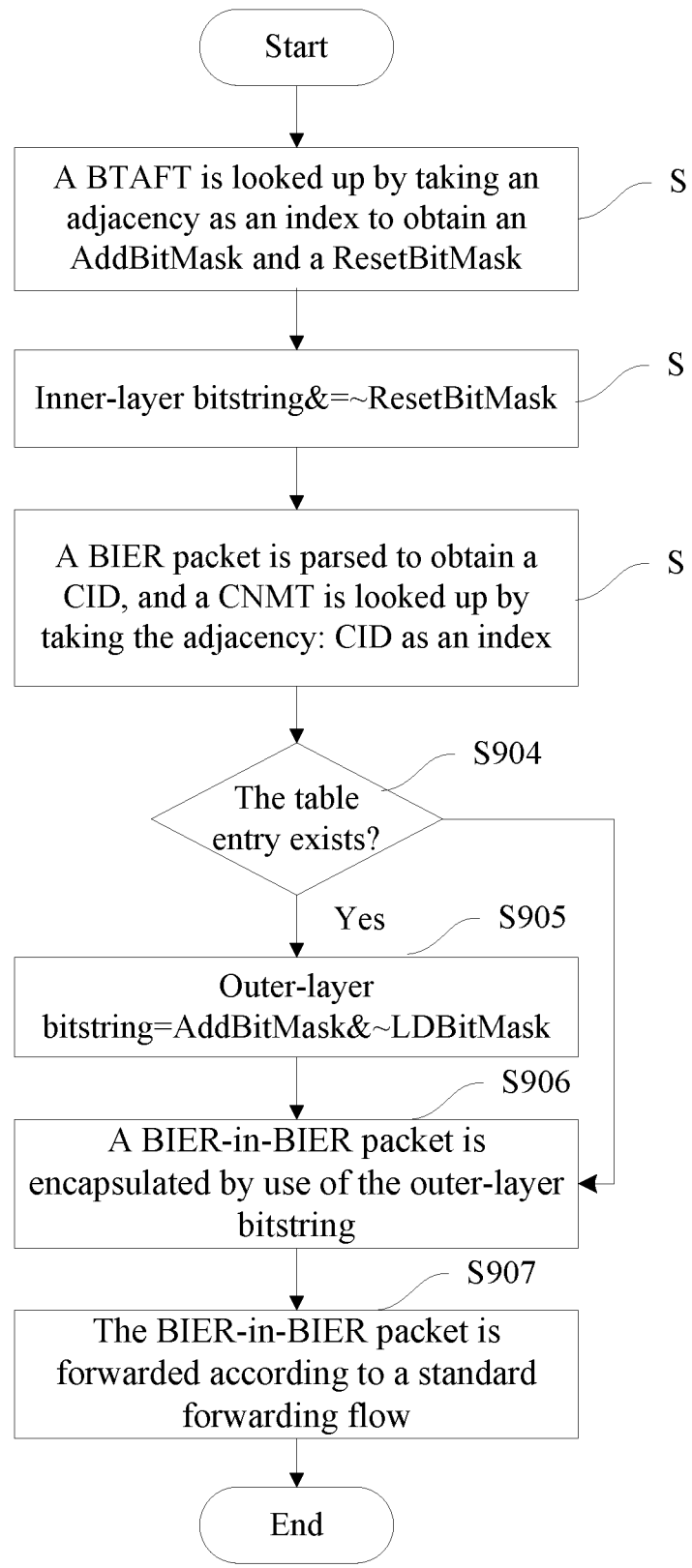
FIG. 9 is a general flowchart of executing BIER-in-BIER FRR according to an embodiment.

In an embodiment of the present disclosure when a certain adjacency of a PLRN fails, a general BBE FRR flow can be modified as follows. FIG. 9 is a general flowchart of executing BIER-in-BIER FRR according to the embodiment, as shown in FIG. 9, the flow includes the following operations.

In S901, a BTAFT is looked up by taking the adjacency as an index to obtain a ResetBitMask and an AddBitMask.

In S902, a bitstring of an inner-layer BIER packet is modified, inner-layer bitstring&=~ResetBitMask.

In S903, a BIER packet is parsed to obtain a BMID of a multicast service to which the data packet belongs.

In S904, a CNMT is looked up by taking the adjacency and the BMID as indexes, if the table entry exists, an LDBitMask is obtained, and otherwise operation 6) is executed.

In S905, a bitstring of an outer-layer BIER packet is calculated, outer-layer bitstring=AddBitMask&~LDBitMask.

In S906, a BIER-in-BIER data packet is encapsulated by use of the outer-layer bitstring.

In S907, the BIER-in-BIER data packet is forwarded according to a standard BIER-TE forwarding flow.

Embodiments of preventing duplicate packets may be applied to other BIER-TE FRR solutions. For example, for HM FRR, the controller may calculate FRR backup path information corresponding to a certain BMID for a certain adjacency in advance (a calculation scale is higher than that of the BBE solution), and bitstring information of the FRR backup path may be represented by use of the LDBitMask field in the CNMT structure shown in FIG. 8.

Exemplarily, for a certain adjacency of a PLRN in a multicast tree corresponding to a BMID of a certain multicast service, an LDBitMask in HM FRR may be calculated through the flow including the following operations:

a set of all BFERs of the multicast service is statistically obtained;

for each BFER, whether the BFER is in a subtree taking an NH as the parent node in the multicast tree or not is judged, and if the BFER is not in such a subtree, the BFER is removed from the set; and a failure link in a topology is removed, a backup multicast path starting with the PLR and ending with the BFER is calculated (a failed node only serves as an intermediate node as much as possible during path computation), and a bitstring, i.e., an LDBitMask, corresponding to the FRR multicast tree is obtained.

When a failure occurs, the PLR firstly obtains a BMID of a BIER packet and looks up a CNMT according to the adjacency and the BMID to obtain the bitstring of the backup path, modifies information of a bitstring field of a BIER header, and then forwards an HM FRR data packet according to a normal BIER forwarding flow.

The embodiment also includes the following implementation modes.

Implementation Mode 1

Three solutions of encapsulating BMID information in a BIER header and one solution of maintaining the BMID related information in a forwarding apparatus are proposed in the implementation mode 1 of the embodiments of the present disclosure. FIGS. 10A to 10C are schematic diagrams showing the forms of representing BMID information according to the implementation mode 1. The BMID information may be represented in three forms described in detail in the following parts 1), 2) and 3), with reference to FIGS. 10A, 10B, and 10C, respectively.

1) A field with a length of 20 bits is added after a BFIR-id field in the BIER header to represent the BMID information. As shown in FIG. 10A, this added field can represent 220 BMIDs, and the BMIDs are assigned with values in a range of [1, 220].

2) The BMID information is represented by an Entropy field, as shown in FIG. 10B. In BIER-TE, the control plane is responsible for calculating and transmitting a multicast service route, and load balancing is implemented by the upper control plane instead, so that the BMID information may be represented by the Entropy field in BIER-TE. For avoiding influence on an original role of the Entropy, a first bit of a Resv field may be used as a BMID flag bit, and if the value of this first bit is 0, the meaning of the Entropy is kept unchanged, otherwise the Entropy represents the BMID information. Since a length of the Entropy field is 20 bits, the Entropy field can represent 2^20 BMIDs, and the BMIDs are assigned with values in a range of [1, 2^20].

3) The BMID information is represented by a Differentiated Service Code Point (DSCP) field, as shown in FIG. 10C. The DSCP field is not used for an MPLS network, and the practical meaning of the DSCP field can be defined by a user. Since a length of the DSCP field is 6 bits, the DSCP field can represent 2^6 BMIDs. Since BFIR-id information is encapsulated in the BIER header, it is proposed in the implementation mode 1 of the embodiments of the present disclosure that the BFIR-id and DSCP fields may be combined to cooperatively represent one BMID. For two multicast services, if the two multicast services correspond to different BFIRs, then the two multicast services may adopt the same BMID, and in such a case, for each BFIR, 2^6 BMIDs may be represented.

4) The forwarding apparatus maintains the multicast BMID information, as shown in FIG. 7. When a BIER packet is received, the payload may be obtained through decapsulation to obtain information of a multicast source IP address and a multicast destination IP address, so that a BMID corresponding to the data packet may be obtained by looking up a table. In this solution, the number of BMIDs that may be represented is not theoretically limited.

Implementation Mode 2

When the controller calculates the backup path, the NH only serves as a leaf node as much as possible.

Figure 11A:
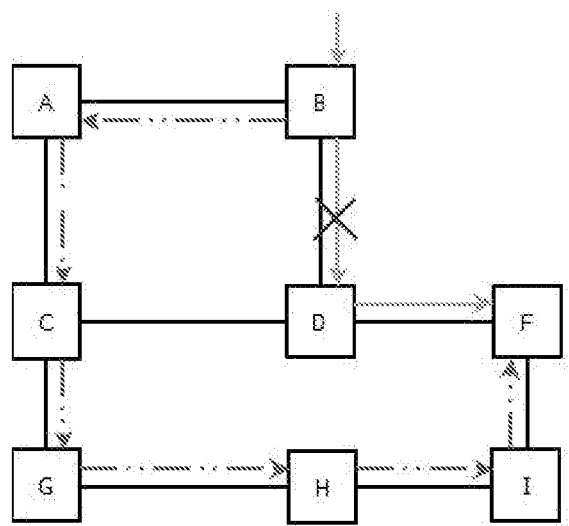
FIGS. 11A and 11B are schematic diagrams of calculating a backup path according to an implementation mode 2.
Figure 11B:
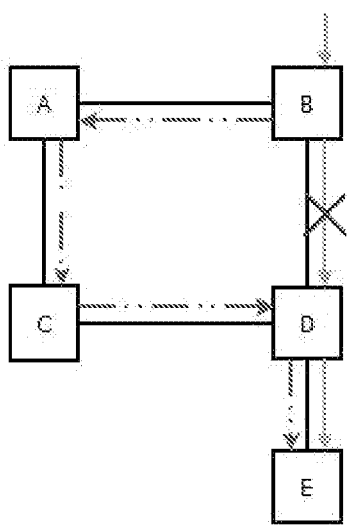

FIGS. 11A and 11B are schematic diagrams of calculating a backup path according to the implementation mode 2. As shown in FIG. 11A, when a failure protection path is calculated for adjacency (B, D), because there is a path B-A-C-G-H-I-F from the node B to the node F (the NNH node of B), B-A-C-D-F involving fewer hops is not adopted. This is because if the NH node D fails, FRR traffic can still normally reach the NNH node F if the protection path B-A-C-G-H-I-F is adopted, but cannot reach the NNH node F if the protection path B-A-C-D-F is adopted.

As shown in FIG. 11B, when the protection path is calculated for the adjacency (B, D), only when there is no other protection path from the node B to the NNH node E except for the protection path passing through the NH node D, the protection path is calculated by taking the NH node D as an intermediate node.

Implementation Mode 3

Figure 12A:
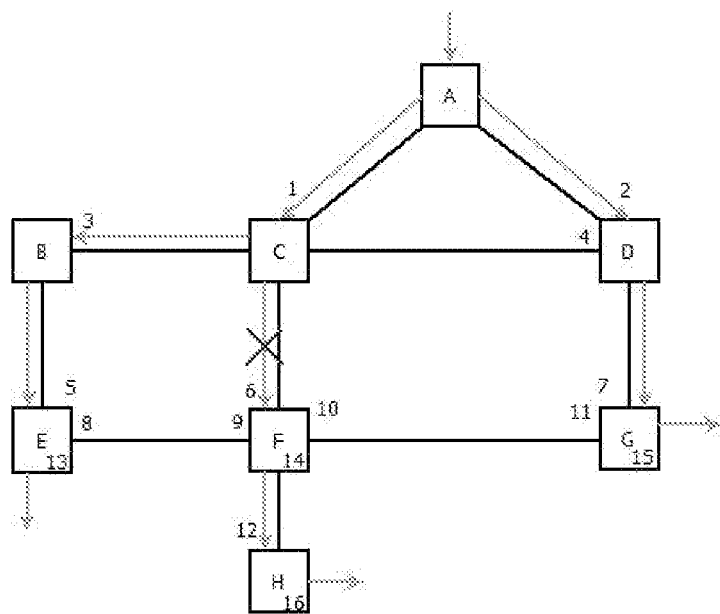
FIGS. 12A and 12B are schematic diagrams of calculation according to an implementation mode 3.
Figure 12B:
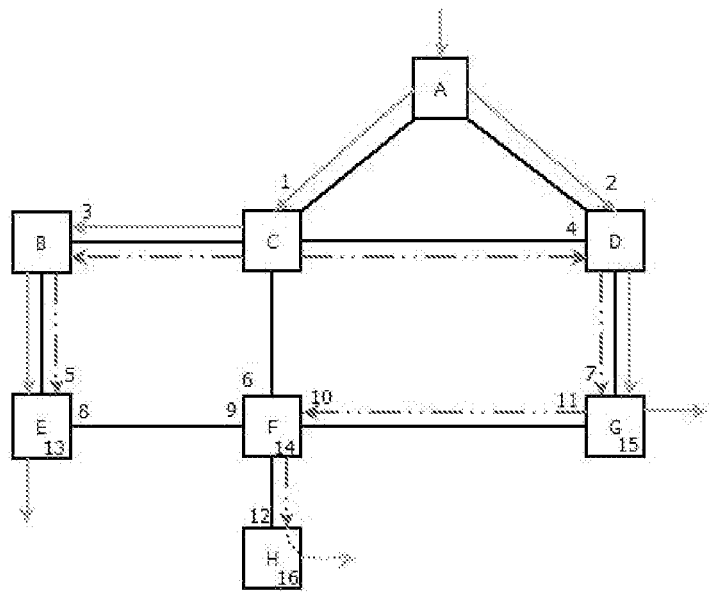

FIGS. 12A and 12B are schematic diagrams of calculation according to the implementation mode 3. As shown in FIGS. 12A and 12B, for adjacency (C, F) of a Point of Local-Repair C (PLRC), an LDBitMask, a ResetBitMask and an AddBitMask are calculated through the following process:

NNH nodes of the PLRC are counted. The NNH nodes of the PLRC as shown in FIGS. 12A and 12B are nodes E, H and G, and local-decap BPs for the NNH nodes E, G and H are 13, 15 and 16 respectively;

since the node G is not a subtree node taking the node C as the parent in a multicast represented by the arrowed solid line in FIG. 12A, the LDBitMask includes 15;

since a link (C, F) is not on a path from the node C to the node E in the multicast tree, the LDBitMask includes 13.

Considering that the LDBitMask includes both 15 and 13, for the adjacency (C, F), the LDBitMask of the multicast service is . . . 0101000000000000;

a BIER tunnel, i.e., a backup multicast path represented by the arrowed dot-and-dash line in FIG. 12B, corresponds to a bitstring 3,5,4,7,10,12,13,14,15,16, therefore, the AddBitMask for the adjacency (C, F) is . . . 01111101001011100;

since a connected BP from the node C to the node F is 6, the ResetBitMask includes 6; and since connected BPs from the node D to the nodes E and H are 8, 11 and 12 respectively, the ResetBitMask includes 8, 11 and 12 in addition to 6. As such, the ResetBitMask for the adjacency (C, F) is . . . 0110010100000.

Implementation Mode 4

Figure 13A:
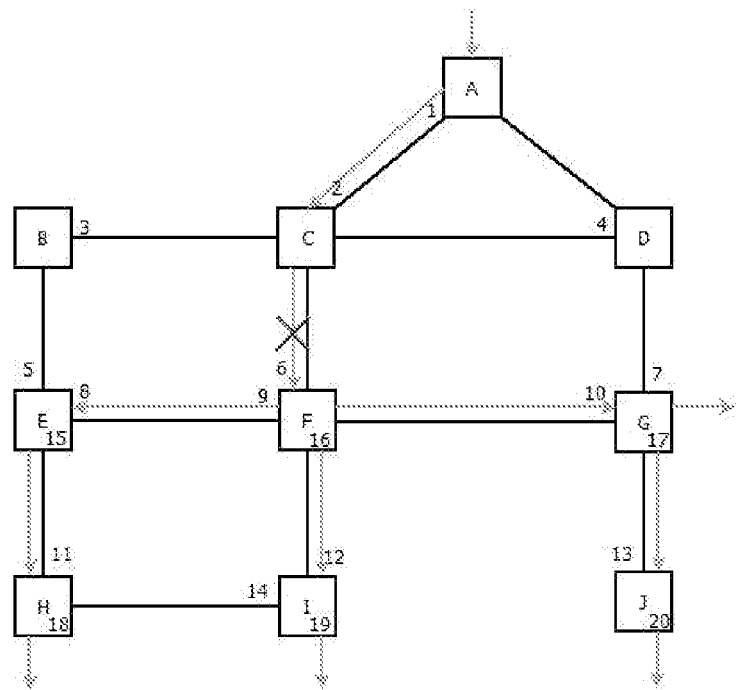
FIGS. 13A and 13B are flowcharts of BBE FRR according to an implementation mode 4.
Figure 13B:
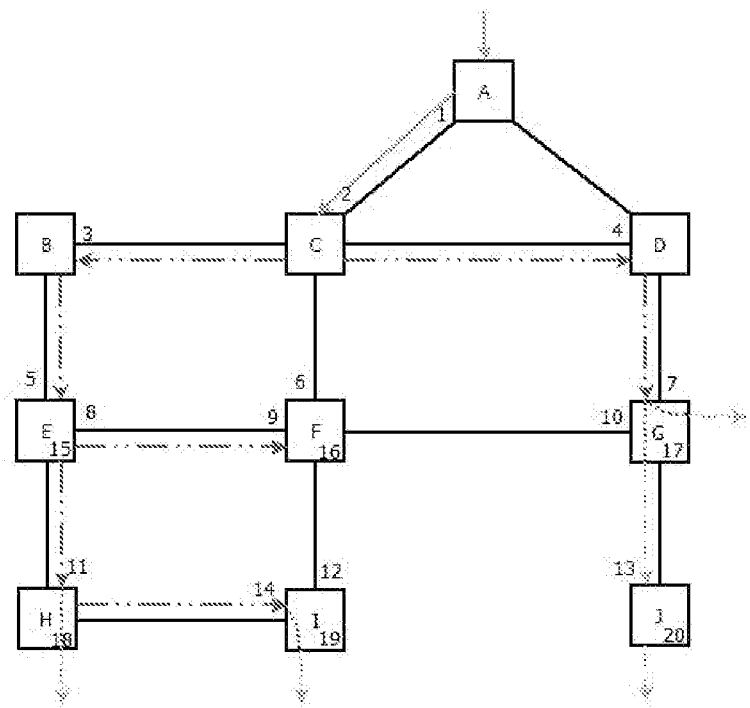

FIGS. 13A and 13B are flowcharts of BBE FRR according to the implementation mode 4. As shown in FIGS. 13A and 13B, an ingress node of a certain multicast service is a node A, and egress nodes of the certain multicast service are nodes G, H, I and J. When an adjacency (C, F) of a Point of Local-Repair C (PLRC) fails in embodiments according to FIGS. 13A and 13B, a BBE FRR flow is as follows:

a BTAFT is looked up by taking the adjacency (C, F) as an index to obtain an AddBitMask . . . 010111100-10101011100 and a ResetBitMask . . . 0101010100000;

a bitstring of an inner-layer BIER packet is . . . 011110001111010100010. After executing inner-layer bitstring&=~ResetBitMask, the inner-layer bitstring is modified to be . . . 0111100010100000 00010;

a CNMT is looked up according to the adjacency and a BMID of a multicast flow, and a corresponding table entry does not exist;

a BIER-in-BIER data packet is encapsulated by taking an AddBitMask as an outer-layer bitstring, and is forwarded according to a standard forwarding flow; and if a link fails, an inner-layer BIER data packet is obtained by executing a decapsulation operation on the BIER-in-BIER data packet at the nodes E, F, G and I; if the node F fails, an inner-layer BIER data packet is obtained by executing a decapsulation operation at the nodes E, G and I. The inner-layer BIER data packet is then forwarded according to the standard forwarding flow.

Implementation Mode 5

Figure 14A:
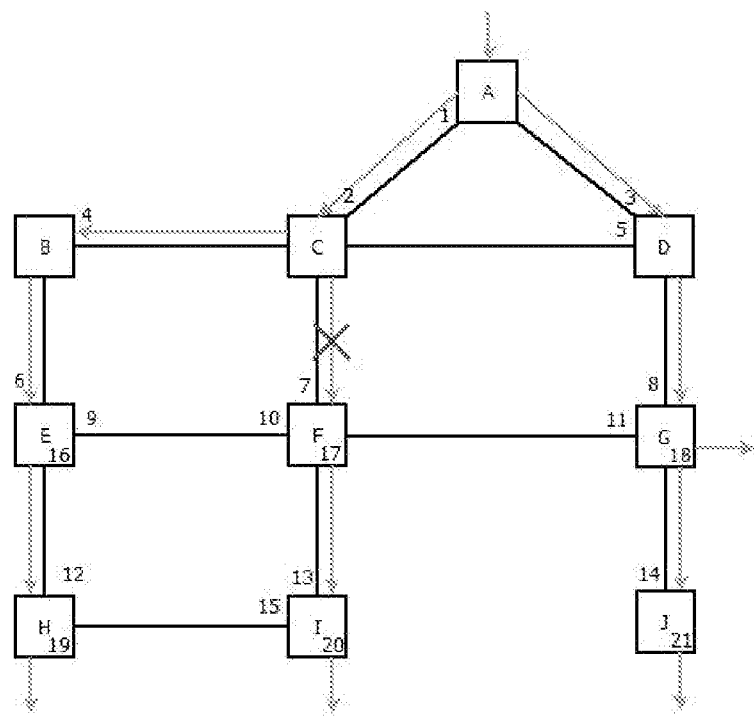
FIGS. 14A to 14C are flowcharts of BBE FRR according to an implementation mode 5.
Figure 14B:
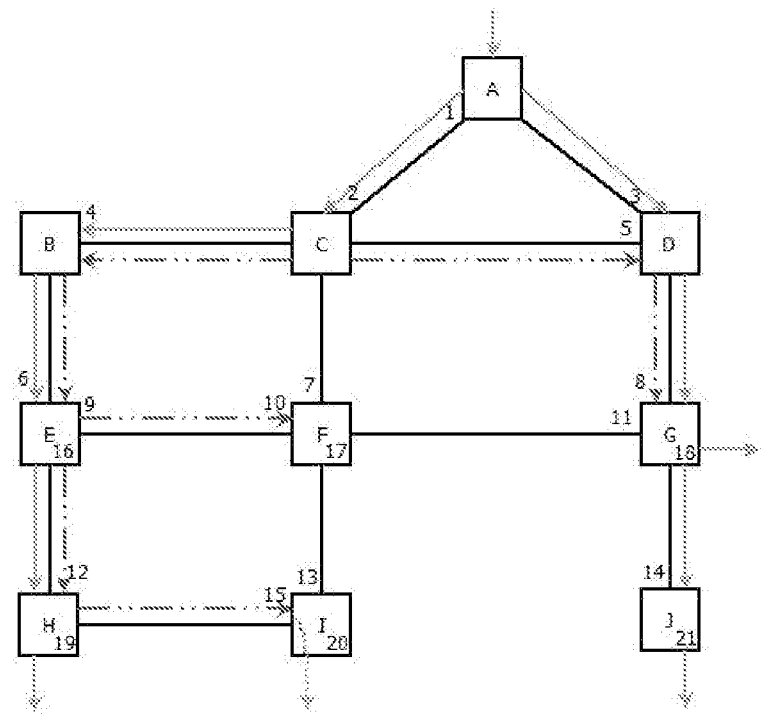
Figure 14C:
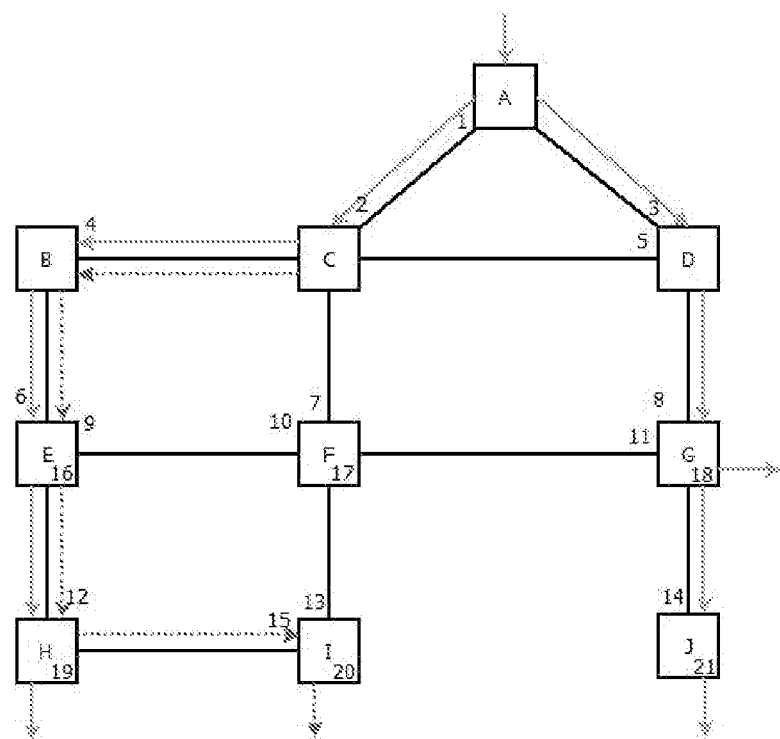

FIGS. 14A to 14C are flowcharts of BBE FRR according to the implementation mode 5. As shown in FIG. 14A to 14C, an ingress node of a certain multicast service is a node A, and egress nodes are nodes G, H, I and J. When an adjacency (C, F) of a Point of Local-Repair C (PLRC) fails in embodiments corresponding to FIGS. 14A, 14B, and 14C, a BBE FRR flow is as follows:

a BTAFT is looked up by taking the adjacency (C, F) as an index to obtain an AddBitMask . . . 01011110010-1010111000 and a ResetBitMask . . . 01010101000000;

a bitstring of an inner-layer BIER packet is . . . 0111100011100011101110. After executing inner-layer bitstring&=~ResetBitMask, the inner-layer bitstring is modified to be . . . 01111000101000101011110;

a CNMT is looked up according to the adjacency and a BMID of a multicast flow to obtain an LDBitMask . . . 0101000000000000;

a bitstring of an outer-layer BIER packet is AddBitMask&~LDBitMask, i.e., . . . 010010100101110011000;

a BIER-in-BIER data packet is encapsulated by use of an outer-layer bitstring, and is forwarded according to a standard forwarding flow; and if a link fails, an inner-layer BIER data packet is obtained by executing a decapsulation operation on the BIER-in-BIER data packet at the nodes F and I; if the node F fails, an inner-layer BIER data packet is obtained by executing the decapsulation operation only at the node I. The inner-layer BIER data packet is then forwarded according to the standard forwarding flow.

Implementation Mode 6

As shown in FIG. 14A, for HM FRR, an ingress node of a certain multicast service is a node A, egress nodes are nodes G, H, I and J, and there is made such a hypothesis that a corresponding multicast identifier is a BMID. For adjacency (C, F), a backup path computation method proposed for HMFRR in the embodiments of the present disclosure is executed. Specifically, a BFER set of a backup path is firstly calculated to be {I}, then the backup path of the adjacency corresponding to the BMID is calculated, as represented by the dotted line in FIG. 14C, and a corresponding bitstring is . . . 010000100100000101000. When (C, F) fails, the Point of Local-Repair C (PLRC) only needs to look up a table according to the adjacency and the BMID to obtain a backup bitstring, replace a header bitstring of a failure BIER packet with the backup bitstring and then forward an FRR BIER packet according to a standard flow.

Embodiment 4

The embodiment of the present disclosure also provides a storage medium in which a computer program is stored. The computer program, when being executed, performs the operations in any abovementioned method embodiments.

In at least one exemplary embodiment, the storage medium may be configured to store a computer program configured to perform the following operations:

BMID information of a data packet is set, wherein the BMID information is used for indicating a multicast channel to which the data packet belongs; and the BMID information is sent to a BFIR.

In at least one exemplary embodiment, the storage medium may include, but not limited to, various medium capable of storing computer programs such as a U disk, a ROM, a RAM, a mobile hard disk, a magnetic disk or an optical disk.

The embodiment of the present disclosure also provides an electronic device which includes a memory and a processor. A computer program is stored in the memory. The processor is configured to execute the computer program to perform the operations in any abovementioned method embodiment.

In at least one exemplary embodiment, the electronic device may further include a transmission device and an input/output device. The transmission device is connected with the processor, and the input/output device is connected with the processor.

In at least one exemplary embodiment, the processor in the embodiment may be configured to perform the following operations through the computer program:

BMID information of a data packet is set, wherein the BMID information is used for indicating a multicast channel to which the data packet belongs: and the BMID information is sent to a BFIR.

It is apparent that those skilled in the art should know that each module or each operation of the present disclosure may be implemented through a universal computing device. They may be concentrated in a single computing device or distributed in a network formed by multiple computing devices. Optionally, they may be implemented by program codes executable for the computing devices and thus may be stored in a storage device for execution with the computing devices. Moreover, in some cases, the shown or described operations may be executed in sequences different from those described here, or may form various integrated circuit modules respectively, or multiple modules or operations therein may form a single integrated circuit module for implementation. Therefore, the present disclosure is not limited to any specific hardware and software combination.

The above is only the exemplary embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection of the present disclosure.

What is claimed is:

1. A data packet processing method, comprising:
creating a Channel Node Mapping Table (CNMT) at a local node, wherein table entries of the CNMT comprise adjacency, BMID information and an LDBitMask formed by the local-decap BP information of each NNH on which the pop-up operation is not required to be executed for the data packet; and when the adjacent node fails, performing Fast ReRouter (FRR) protection on a data packet to be sent to the adjacent node according to the CNMT, wherein the data packet contains Bit Index Explicit Replication (BIER) Multicast Identifier (BMID) information, and the BMID information is used for determining the multicast route of the data packet;

wherein performing FRR protection on the data packet of the adjacent node according to the CNMT comprises:
looking up a BIER-Traffic Engineering (BIER-TE) Adjacency FRR Table (BTAFT) by taking an adjacency as an index to obtain a ResetBitMask and an AddBitMask;
modifying a bitstring of an inner-layer BIER header according to the ResetBitMask;
parsing an outer-layer BIER header to obtain the BMID information of a multicast service to which the data packet belongs;
looking up the CNMT by taking the adjacency and the BMID information as indexes to obtain the LDBitMask;
calculating a bitstring of the outer-layer BIER header according to the AddBitMask and the LDBitMask; and
encapsulating a BIER-in-BIER data packet by use of the bitstring of the outer-layer BIER header, and forwarding the BIER-in-BIER data packet,
wherein the data packet comprises an inner-layer BIER packet and an outer-layer BIER packet.

2. The method as claimed in claim 1, wherein performing FRR protection on the data packet to be sent to the adjacent node according to the CNMT comprises:
querying the CNMT and determining to execute the pop-up operation on the data packet on the NNH, which is specified by a bitstring in an outer-layer BIER header, of the adjacent node.

3. The method as claimed in claim 2, wherein querying the CNMT comprises:
acquiring the BMID information in the data packet; and
querying the CNMT according to the BMID information.

4. A non-transitory storage medium in which a computer program is stored, wherein the computer program, when being executed, performs the method as claimed in claim 1.

5. An electronic device, comprising a memory and a processor, wherein a computer program is stored in the memory; and the processor is configured to execute the computer program to perform the method as claimed in claim 1.

\* \* \* \* \*